W. J. DOSSETTER.
SPRING GRIP ATTACHMENT FOR DUMB BELLS.
APPLICATION FILED OCT. 18, 1909.

965,284.

Patented July 26, 1910.

Witnesses
William C. Linton.
D. W. Gould.

Inventor
William J. Dossetter
Joshua R. H. Potts.
Attorney

UNITED STATES PATENT OFFICE.

WILLIAM JAMES DOSSETTER, OF CLERKENWELL, LONDON, ENGLAND.

SPRING-GRIP ATTACHMENT FOR DUMB-BELLS.

965,284. Specification of Letters Patent. Patented July 26, 1910.

Application filed October 18, 1909. Serial No. 523,339.

*To all whom it may concern:*

Be it known that I, WILLIAM JAMES DOSSETTER, a subject of His Majesty the King of England, formerly residing at Shepherd's Bush, London, but now of Clerkenwell, London, aforesaid, England, have invented certain new and useful Improvements in Spring-Grip Attachments for Dumb-Bells, of which the following is a specification.

This invention relates to detachable grips for use with ordinary dumb-bells and has for its object to provide a more simple and convenient device of this kind that will be more readily detachable therefrom, it being merely held in combination therewith by the grip of the user without in any way being clipped thereon, a still further improvement consisting in the arrangement of the springs and parts so that an absolutely straight pull of considerable amount can be obtained, while the gripping member is kept within gripping distance of the dumb-bell handle.

The grip consists of two members one being capable of resting on the grip of the dumb-bell, the other member being slidably mounted in relation thereto and normally kept apart by a spring or springs. The springs may be of any type secured at one extremity, or other suitable part, to the hand-gripping member and arranged at the other extremity, or another appropriate part, to engage the shank, stem or handle of the dumb-bell member.

Figure 1:
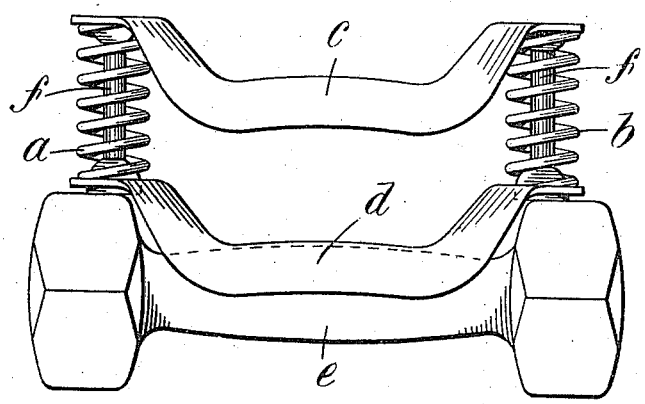
Figure 2:
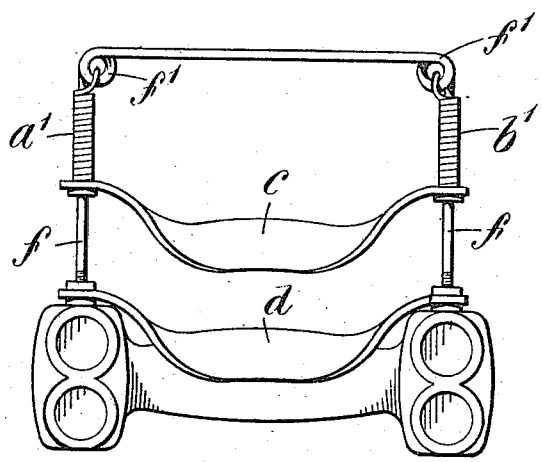

In the accompanying drawings with reference to which I will now describe my invention:—Figure 1 is a side elevation of one form of the detachable grip in position on a dumb-bell; Fig. 2 is a similar view of a slightly modified form illustrating a convenient way of employing tension springs.

In the form shown in Fig. 1 of the drawings the grip consists of a pair of springs $a$ $b$ spaced apart and each fastened at the opposite ends to two members $c$ $d$, one $d$ of which is shaped to the contour of the dumb-bell shank stem or handle $e$, while the other member $c$ is fashioned to form a hand-gripping part. Both members may as shown consequently be alike, and be semi-circular in cross section. The springs $a$ $b$ are as shown arranged around spindles $f$ that are fastened at their lower ends to the dumb-bell member $d$ the upper member being free to slide on the said rods its outward movement being limited by heads formed thereon. The spindles $f$ in this figure are not essential as the springs $b$ could be used without them. Instead of employing single springs at each end of the grip I may employ a plurality which may be so arranged that one or more can be removed to vary the grip or resisting power of the device according to requirements.

For use, the member $d$ is applied over the dumb-bell shank stem or handle $e$ which is then gripped by the fingers and the other member $c$ is gripped by the thumb, whereupon the dumb-bell can be manipulated as required. When finished with, the attachment and dumb-bell fall apart or become detached. The springs $a'$ $b'$ may also as in Fig. 2 be arranged to act in tension when the dumb-bell is gripped, in which event the springs would be external to the gripping member $c$ which is held by the fingers. The outer ends of the springs $a'$ $b'$ are in this case attached to loops $f'$ formed as continuations of the central stems or spindles $f$ which are here shown formed from a single piece of wire, and the inner ends to the gripping member $c$.

Obviously the device could be made in various sizes and strengths and even where single springs are employed they might easily be made renewable or interchangeable with weaker or stronger ones as desired.

What I claim and desire to secure by Letters Patent of the United States is:—

1. A detachable spring grip for use with ordinary dumb-bells comprising a pair of spaced members, one formed for resting on or in contact with the dumb-bell and the other formed as a hand gripping member, a pair of straight spindles on which the said members are slidably mounted in relation to each other and springs coöperating with the said members to keep them normally apart, the whole of the parts being so combined that a straight pull of considerable length can be obtained.

2. A detachable spring grip for use with ordinary dumb-bells comprising a pair of spaced members, one formed for resting on or in contact with the dumb-bell and the other formed as a hand gripping member, a pair of straight spindles on which the said members are slidably mounted in relation to each other and compression springs mounted around the said spindles between the two spaced members and coöperating with the said members to keep them normally apart, the whole of the parts being so combined that a straight pull of considerable length can be obtained.

3. A detachable spring grip for use with ordinary dumb-bells comprising a pair of spaced members, one formed for resting on or in contact with the dumb-bell and the other formed as a hand gripping member, a pair of straight spindles on which the said members are slidably mounted in relation to each other and springs mounted around the said spindles and coöperating with the said members to keep them normally apart, the whole of the parts being so combined that a straight pull of considerable length can be obtained.

In testimony, that I claim the foregoing as my invention, I have signed my name in presence of two subscribing witnesses.

WILLIAM JAMES DOSSETTER.

Witnesses:
  J. S. ARTHERS,
  L. BLAKEY.